United States Patent
Katsuta et al.

(10) Patent No.: US 10,442,673 B2
(45) Date of Patent: Oct. 15, 2019

(54) LOADING-UNLOADING ASSIST SYSTEM

(71) Applicant: TOYOTA JIDOSHA KABUSHIKI KAISHA, Toyota-shi, Aichi-ken (JP)

(72) Inventors: Kosuke Katsuta, Toyota (JP); Naotoshi Miyamoto, Seto (JP); Kazumi Sugita, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 147 days.

(21) Appl. No.: 15/691,964

(22) Filed: Aug. 31, 2017

(65) Prior Publication Data
US 2018/0079637 A1 Mar. 22, 2018

(30) Foreign Application Priority Data
Sep. 16, 2016 (JP) ................. 2016-181672

(51) Int. Cl.
| H01M 2/10 | (2006.01) |
| B67D 7/02 | (2010.01) |
| B67D 99/00 | (2010.01) |
| F17C 11/00 | (2006.01) |
| H01M 8/0202 | (2016.01) |
| H01M 8/04082 | (2016.01) |
| H01M 8/2404 | (2016.01) |
| H01M 8/2475 | (2016.01) |

(52) U.S. Cl.
CPC ........... B67D 7/0288 (2013.01); B67D 99/00 (2013.01); F17C 11/005 (2013.01); H01M 2/1066 (2013.01); H01M 8/0269 (2013.01); H01M 8/04201 (2013.01); H01M 8/2404 (2016.02); H01M 8/2475 (2013.01)

(58) Field of Classification Search
CPC .. B65G 1/04; H01M 2/10; H01M 2002/0205; H01M 2/0207; H01M 8/2404; H01M 2/1066
See application file for complete search history.

(56) References Cited

U.S. PATENT DOCUMENTS

| 8,851,819 B2 * | 10/2014 | Kamikawa ........ H01L 21/67727 414/222.07 |
| 9,543,178 B2 * | 1/2017 | Lee ................. H01L 21/67294 |
| 2012/0133371 A1 | 5/2012 | Toomre et al. |
| 2015/0217339 A1 * | 8/2015 | Sakashita ............ H01L 21/6773 134/115 R |
| 2016/0013087 A1 * | 1/2016 | Yoshioka .......... H01L 21/67769 414/659 |
| 2019/0074490 A1 * | 3/2019 | Ishimaru ................. H01M 2/10 |

FOREIGN PATENT DOCUMENTS

| JP | 2013177215 A | 9/2013 |
| JP | 2014007006 A | 1/2014 |
| JP | 2014041702 A | 3/2014 |
| JP | 2014229578 A | 12/2014 |

* cited by examiner

Primary Examiner — Kaitlin S Joerger
(74) Attorney, Agent, or Firm — Dickinson Wright, PLLC

(57) ABSTRACT

A loading-unloading assist system includes a holder that holds a plurality of single cells such that the single cells are detachable from the holder, and a lifting device that moves the holder up and down. The holder holds the plurality of single cells in a state where the single cells are arrayed in a straight line at predetermined intervals.

3 Claims, 10 Drawing Sheets

FIG. 7A
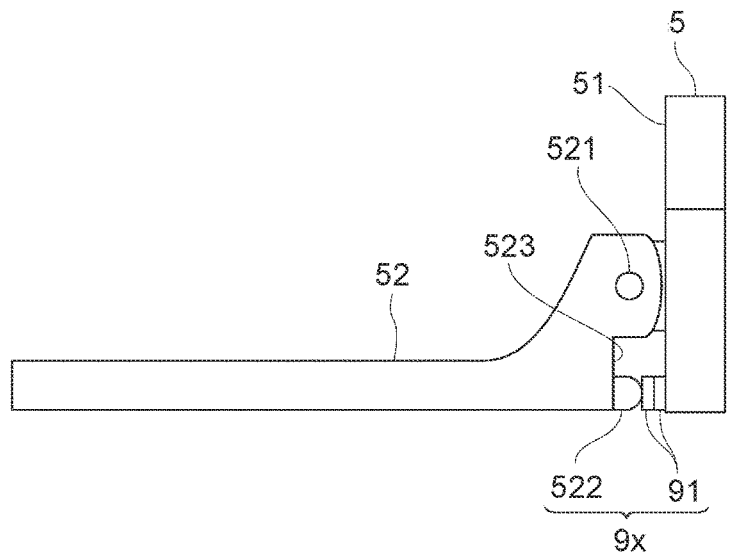
FIG. 7B
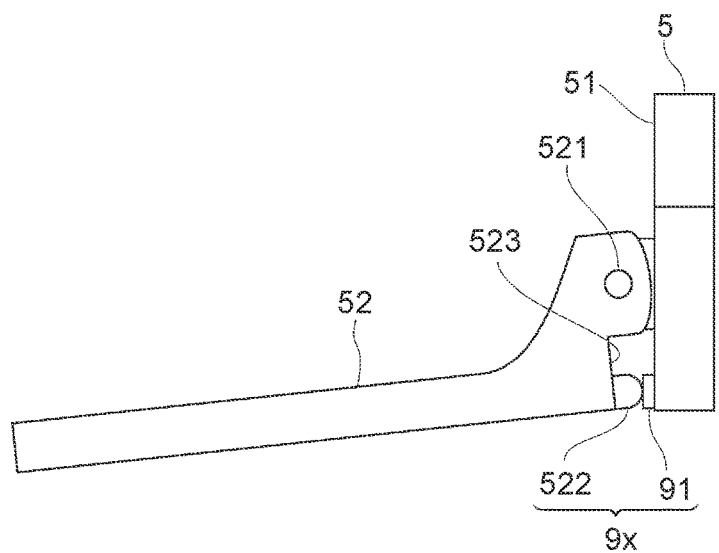
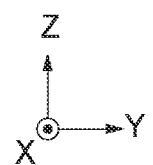

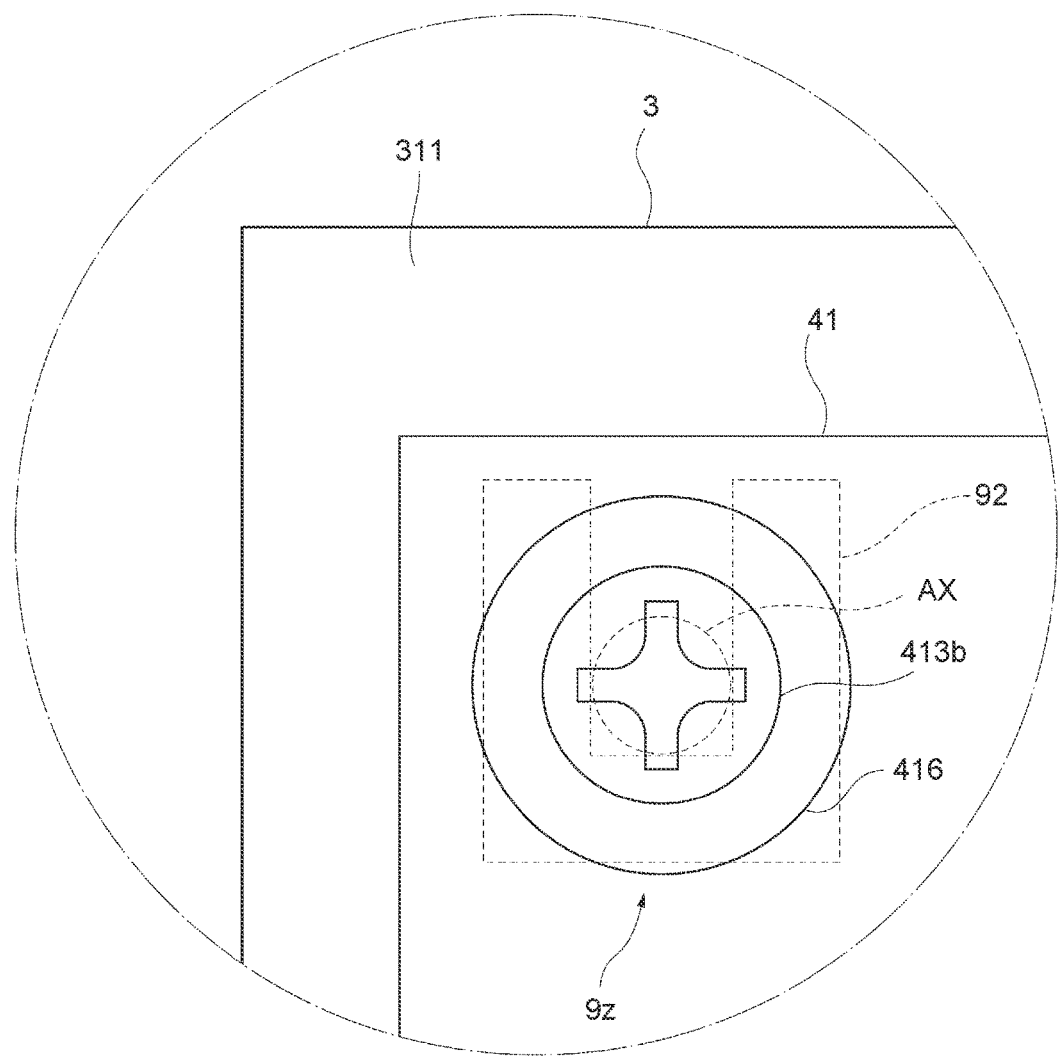

FIG. 10A
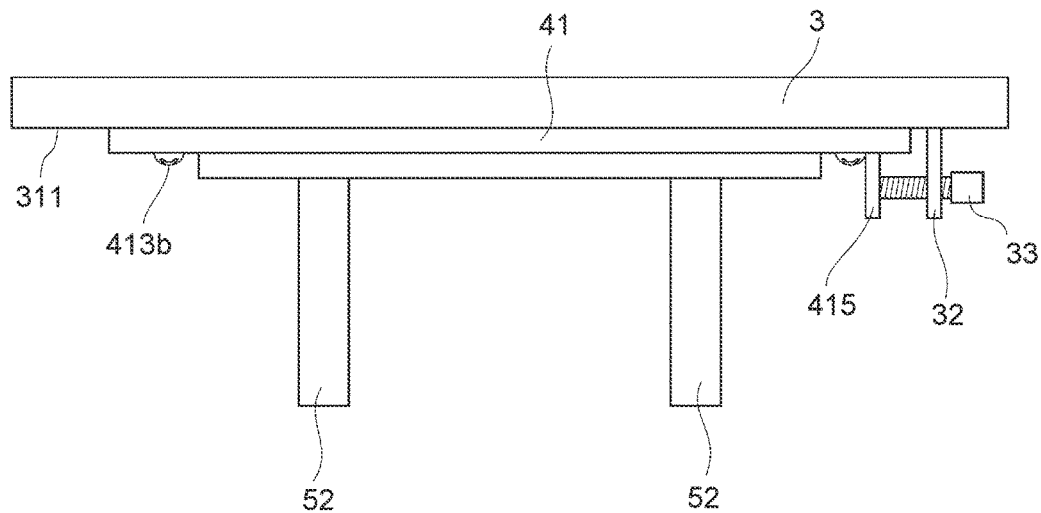
FIG. 10B
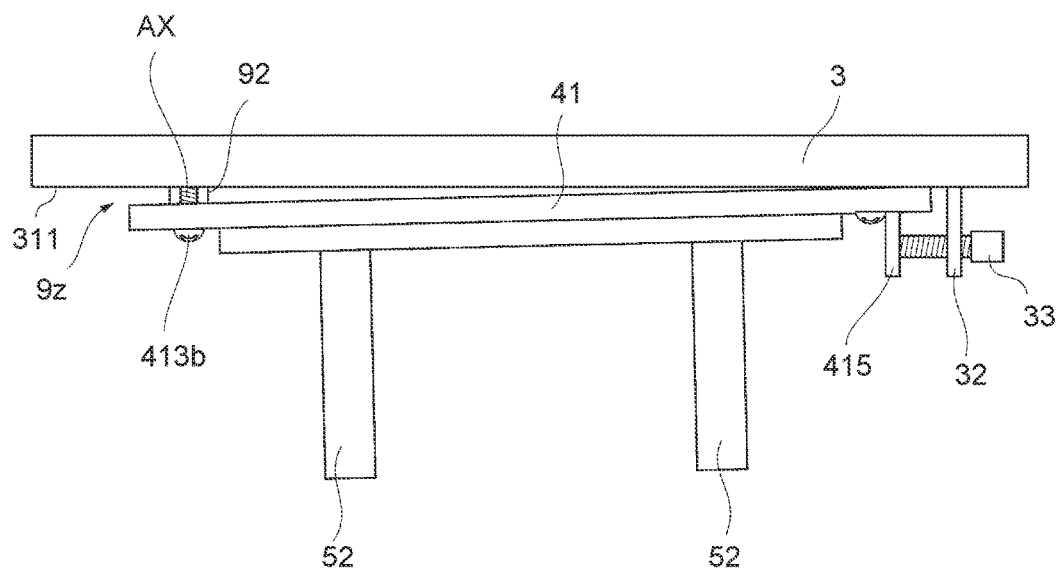
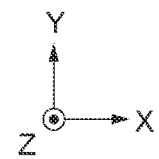

LOADING-UNLOADING ASSIST SYSTEM

INCORPORATION BY REFERENCE

The disclosure of Japanese Patent Application No. 2016-181672 filed on Sep. 16, 2016 including the specification, drawings and abstract is incorporated herein by reference in its entirety.

BACKGROUND

1. Technical Field

The present disclosure relates to a loading-unloading assist system that assists in an operation of loading or unloading a plurality of single cells onto or from an inspection device.

2. Description of Related Art

Development of fuel cells that generate electricity from a fuel gas and an oxidation gas supplied thereto has been pursued. A cell stack composed of a plurality of series-connected single cells is commonly used to generate a large amount of electricity.

It is preferable that inspection on the power generation performance of such a fuel cell be conducted before the fuel cell is installed in a vehicle etc. Japanese Patent Application Publication No. 2014-229578 describes an inspection device that inspects the power generation performance of single cells by supplying a fuel gas and an oxidation gas to the single cells and making them generate electricity.

This inspection device includes a plurality of intermediate plates that are arrayed in a straight line at predetermined intervals. Each intermediate plate has a large number of through-holes that serve as flow passages through which the fuel gas and the oxidation gas are supplied to the single cells. Each single cell is mounted between two adjacent intermediate plates. It is possible to collectively inspect the power generation performance of the single cells by independently disposing the plurality of single cells so as to be spaced by the intermediate plates.

SUMMARY

In the inspection device described in JP 2014-229578 A, it is necessary to prevent leakage of the fuel gas and the oxidation gas. To do so requires the single cells to be mounted onto the inspection device with high accuracy; for example, the single cells should be disposed in an appropriate positional relation with the intermediate plates. Moreover, when removing the single cells from the inspection device, it is necessary to move the single cells so as not to be damaged by interfering with the intermediate plates etc. The operation of loading or unloading the plurality of single cells onto or from the inspection device so as to satisfy such requirements places a heavy burden on an operator.

The present disclosure provides a loading-unloading assist system that can relieve the burden of the operation of loading or unloading a plurality of single cells onto or from an inspection device.

An aspect of the present disclosure is a loading-unloading assist system that assists in an operation of loading or unloading a plurality of single cells onto or from an inspection device, and includes a holder configured to hold a plurality of single cells such that the single cells are detachable from the holder, and a lifting device configured to move the holder up and down. The holder is configured to hold the plurality of single cells in a state where the single cells are arrayed in a straight line at predetermined intervals.

According to this configuration, an operator can collectively perform the operation of loading or unloading the plurality of single cells onto or from the inspection device by holding the plurality of single cells by the holder and moving this holder up and down by the lifting device. As a result, the burden of the operation of loading or unloading the plurality of single cells onto or from the inspection device can be relieved.

In the above aspect, the holder may hold one end of each of the plurality of single cells.

In the above aspect, the lifting device may include: a base; arms configured to support the holder and move in a vertical direction relative to the base; and angle adjustment mechanisms configured to adjust an angle formed by the arms relative to the base.

In the above aspect, the lifting device may include an adjustment plate that is disposed between the arms and the base, and the angle adjustment mechanisms may be configured to adjust the angle formed by the arms relative to the base by adjusting an angle formed by the adjustment plate relative to the base.

In the above aspect, the holder may be configured to hold the plurality of single cells in a state where the single cells are arrayed in parallel to one another.

In the above aspect, the holder may be configured to hold the plurality of single cells in a state where the single cells are arrayed at constant intervals.

According to the present disclosure, it is possible to provide a loading-unloading assist system that can relieve the burden of the operation of loading or unloading a plurality of single cells onto or from an inspection device.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7A is a side view of an arm of FIG. 1;

FIG. 7B is a side view of the arm of FIG. 1;

FIG. 9 is an enlarged view of the part IX of FIG. 1;

FIG. 10A is a plan view of the lifting device of FIG. 1; and

FIG. 10B is a plan view of the lifting device of FIG. 1.

DETAILED DESCRIPTION OF EMBODIMENTS

An embodiment of the present disclosure will be described below with reference to the accompanying drawings. To facilitate understanding of the description, the same components in these drawings will be denoted by the same reference signs as far as possible, and an overlapping description thereof will be omitted.

Figure 1:
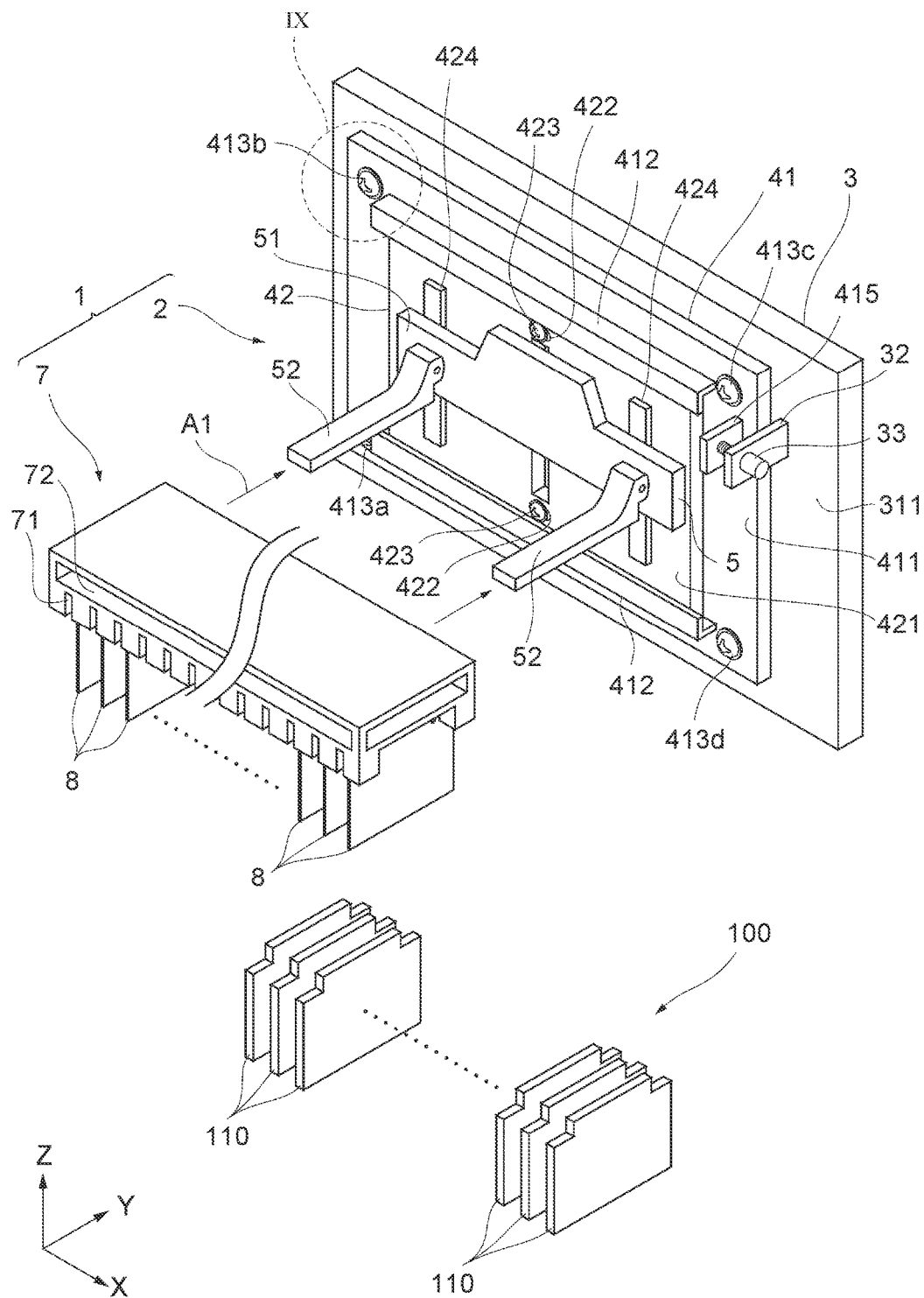
FIG. 1 is a perspective view of a loading-unloading assist system and an inspection device according to an embodiment.
Figure 2:
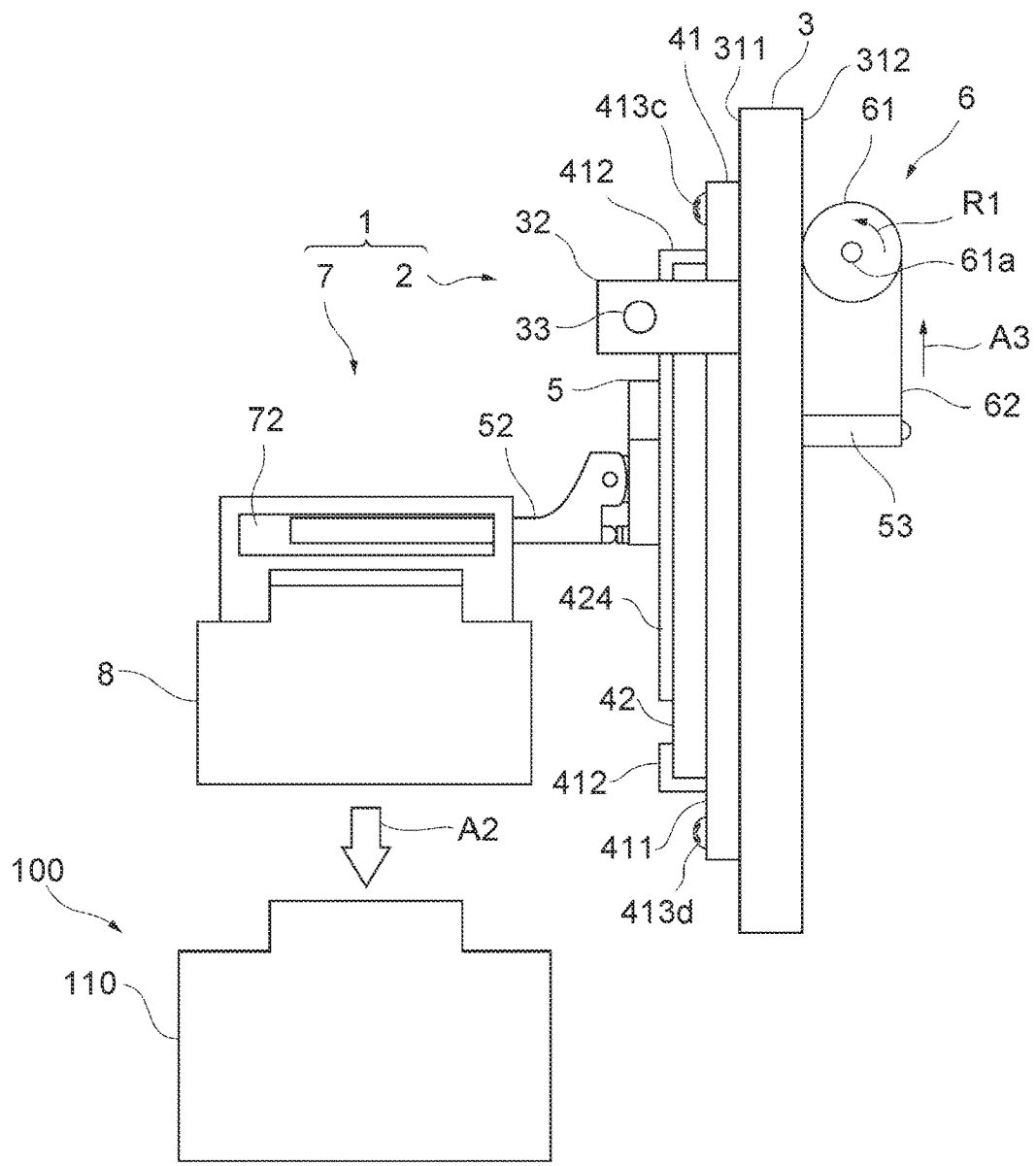
FIG. 2 is a side view of the loading-unloading assist system and the inspection device of FIG. 1.
Figure 3:
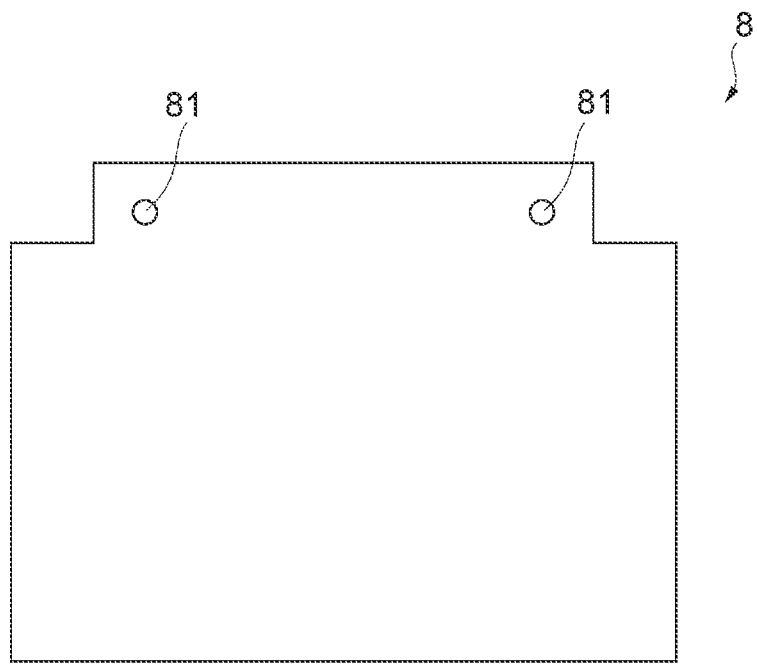
FIG. 3 is a front view of a single cell of FIG. 1.

The configuration of a loading-unloading assist system 1 according to the embodiment will be described with reference to FIG. 1 to FIG. 3. FIG. 1 is a perspective view of the loading-unloading assist system 1 and an inspection device 100. FIG. 2 is a side view of the loading-unloading assist system 1 and the inspection device 100. FIG. 3 is a front view of a single cell 8 of FIG. 1. The loading-unloading assist system 1 is a system that assists in an operation of loading or unloading the plurality of single cells 8 onto or from the inspection device 100. The loading-unloading assist system 1 includes a lifting device 2 and a holder 7.

The lifting device 2 is a device that moves the holder 7 up and down. The lifting device 2 includes a base 3, a first adjustment plate 41, a second adjustment plate 42, a lifting plate 5, and a spring mechanism 6.

The base 3 is a member that is fixed to a floor surface of a factory etc. through legs (not shown). The base 3 has a mounting surface 311 that extends in a vertical direction and a horizontal direction.

In this specification, to facilitate understanding, an orthogonal coordinate system as indicated in FIG. 1, with a horizontal direction in which the mounting surface 311 extends being an X-direction, a vertically upward direction being a Z-direction, and a direction orthogonal to the X-direction and the Z-direction being a Y-direction, is used for description. In FIG. 2 and the subsequent drawings, too, coordinates corresponding to this orthogonal coordinate system are indicated.

A protruding plate 32 that protrudes in a −Y-direction (−Y-direction is a direction opposite to a Y-direction) is formed in the vicinity of an end of the mounting surface 311 in the X-direction. The protruding plate 32 has a through-hole (not shown) that extends through the protruding plate 32 in the X-direction. A female thread is formed in an inner surface of this through-hole. This female thread is engaged with a male thread formed on an adjustment bolt 33.

The first adjustment plate 41 has a plate shape with external dimensions smaller than external dimensions of the base 3. The first adjustment plate 41 is mounted substantially at a center of the mounting surface 311. Four corners of the first adjustment plate 41 are fastened to the mounting surface 311 with screws 413a to 413d.

A pair of rails 412 are provided on a front surface 411 of the first adjustment plate 41. The rails 412 face each other with a space left therebetween in the vertical direction, and extend in the X-direction. The rails 412 have a substantially L-shaped cross-sectional shape.

A protruding plate 415 protruding in the −Y direction is formed in the vicinity of an end of the front surface 411 in the X-direction. The protruding plate 415 is disposed so as to face in the X-direction the protruding plate 32 formed on the base 3, and a leading end of the adjustment bolt 33 is in contact with the protruding plate 415.

The second adjustment plate 42 has a plate shape with external dimensions smaller than the external dimensions of the first adjustment plate 41. The second adjustment plate 42 is mounted substantially at a center of the first adjustment plate 41. Specifically, the second adjustment plate 42 is disposed between the pair of rails 412. The second adjustment plate 42 has a plurality of long holes 422 of which a longitudinal direction coincides with the X-direction. The second adjustment plate 42 is fastened to the first adjustment plate 41 with screws 423 that are inserted through the long holes 422. The second adjustment plate 42 is disposed so as to be movable in the X-direction by being guided by the rails 412. Thus, the positional relation between the second adjustment plate 42 and the first adjustment plate 41 can be adjusted within the range of extension of the long holes 422.

A pair of rails 424 are provided on a front surface 421 of the second adjustment plate 42. The rails 424 face each other in the X-direction with a space left therebetween, and extend in the vertical direction.

The lifting plate 5 is a plate body that is disposed so as to straddle the rails 424. The lifting plate 5 is configured to be movable in the vertical direction by being guided by the rails 424. As shown in FIG. 2, the lifting plate 5 has a protrusion 53 that protrudes in the Y-direction and extends through the base 3, the first adjustment plate 41, and the second adjustment plate 42.

A pair of arms 52 are provided on a front surface 51 of the lifting plate 5. The arms 52 are provided so as to protrude in the −Y-direction from the front surface 51. The arms 52 face each other in the X-direction with a space left therebetween.

As shown in FIG. 2, the spring mechanism 6 is mounted on a back surface 312 of the base 3. The spring mechanism 6 has a constant force spring 61 and a wire 62. As indicated by the arrow R1, the constant force spring 61 generates a constant moment around a shaft 61a. The constant force spring 61 is connected to the protrusion 53 of the lifting plate 5 through the wire 62. Thus, as indicated by the arrow A3, a constant force is applied to the protrusion 53 in an upward direction.

The holder 7 is an instrument that holds the plurality of (e.g., 20) single cells 8 such that the single cells 8 are detachable from the holder 7. The single cells 8 are power generating elements having a plate shape with a width of approximately 300 mm, a height of approximately 200 mm, and a thickness of approximately 1.5 mm, for example, and are stacked in a thickness direction thereof to compose a cell stack. A plurality of holding sections 71 are formed on a lower side of the holder 7. An arm insert section 72 that is a clearance is formed in an upper part of the holder 7.

As shown in FIG. 3, holes 81 are formed at an upper end of the single cell 8. The holding sections 71 respectively hold the upper ends of the single cells 8. Specifically, the holder 7 holds the single cells 8 as projections (not shown) provided on each holding section 71 are inserted into the holes 81. The plurality of single cells 8 are held by the holder 7 in a state where the single cells 8 are arrayed in a straight line at predetermined intervals.

Figure 4:
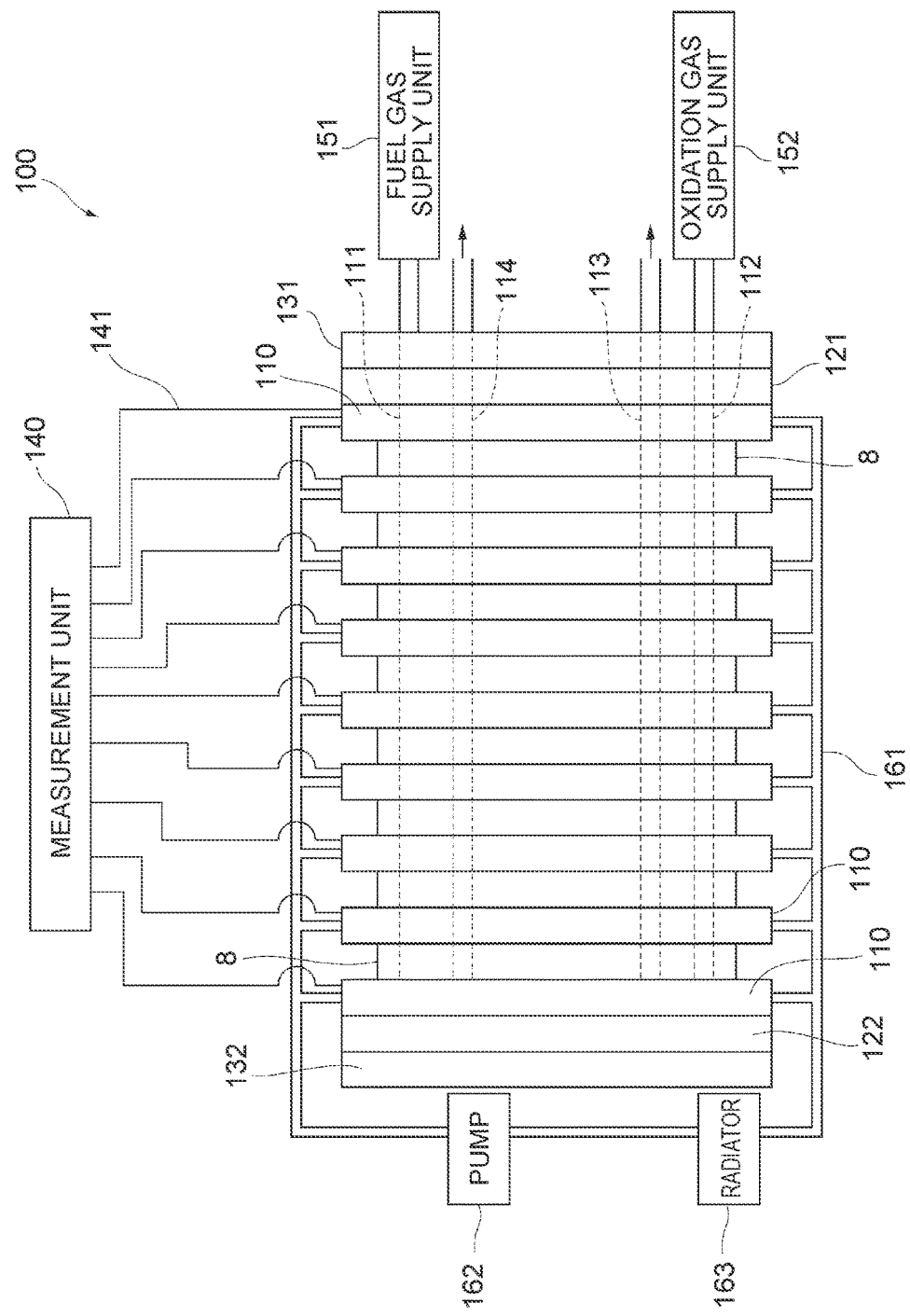
FIG. 4 is a schematic view of the inspection device of FIG. 1.
Figure 5:
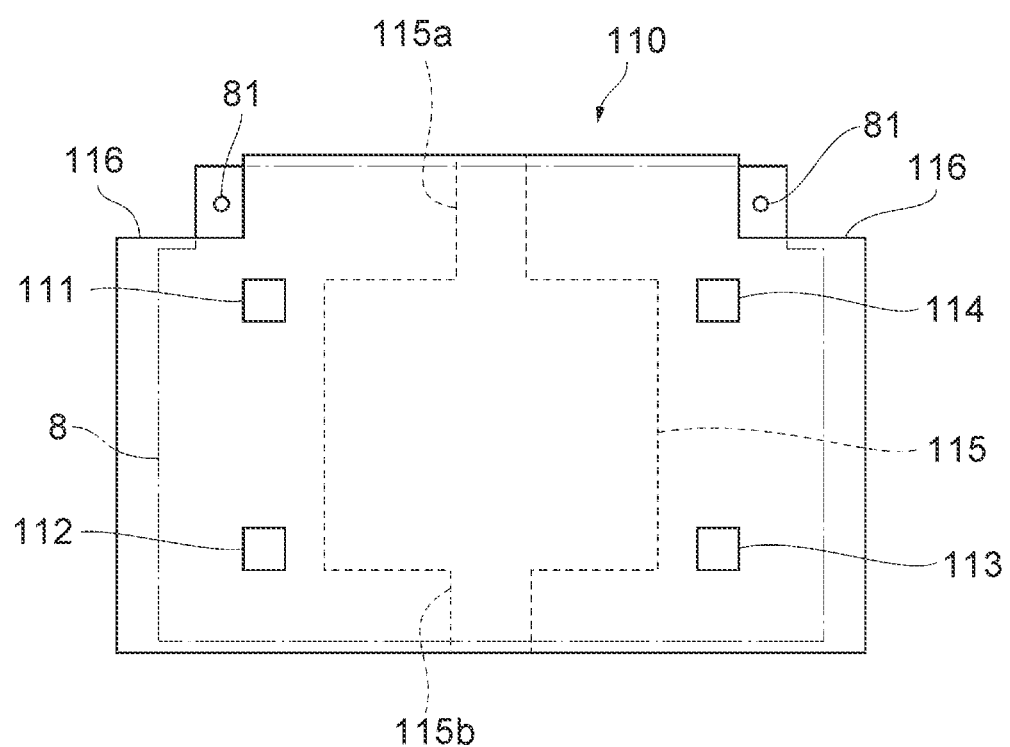
FIG. 5 is a front view of an intermediate plate and the single cell of FIG. 1.
Figure 6:
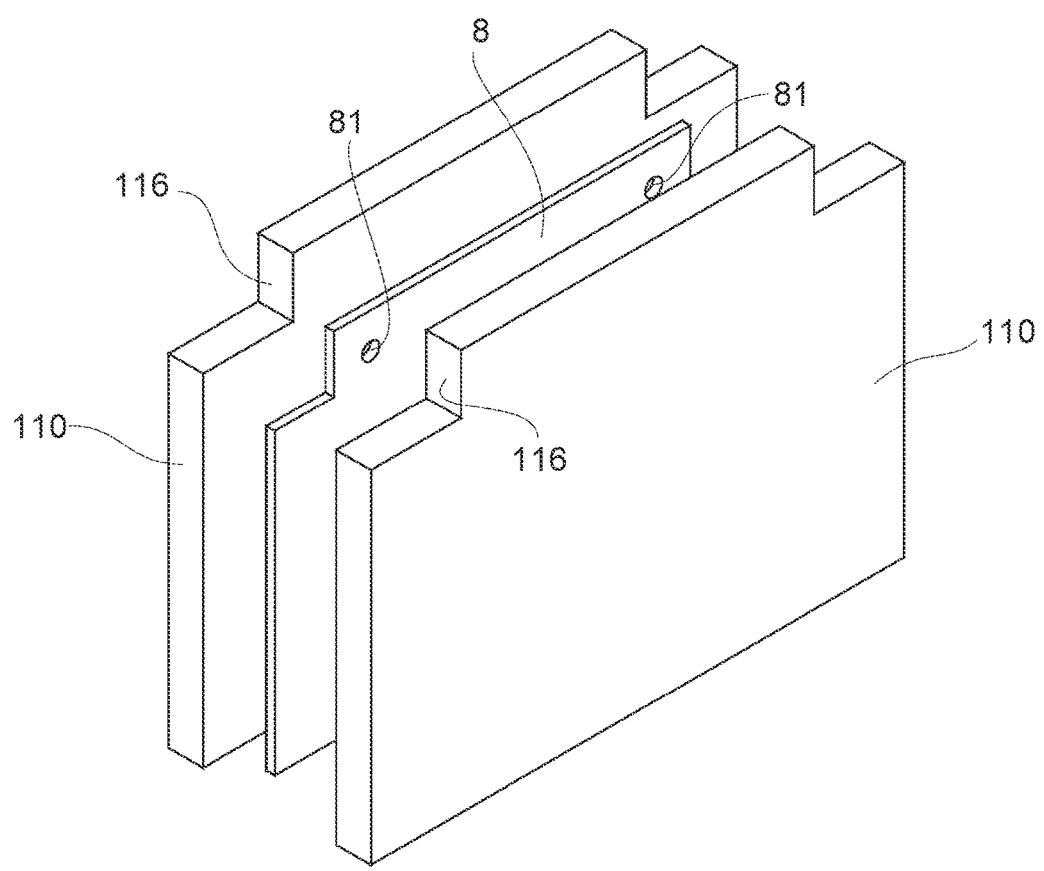
FIG. 6 is a perspective view of the intermediate plates and the single cell of FIG. 1.

Next, the inspection device 100 will be described with reference to FIG. 4 to FIG. 6. FIG. 4 is a front view of the inspection device 100 of FIG. 1. FIG. 5 is a front view of an intermediate plate 110 and the single cell 8 of FIG. 1. FIG. 6 is a perspective view of the intermediate plates 110 and the single cell 8 of FIG. 1.

The inspection device 100 is a device that inspects the power generation performance of the plurality of single cells 8. The inspection device 100 has the plurality of intermediate plates 110, insulators 121, 122, end plates 131, 132, a measurement unit 140, a fuel gas supply unit 151, an oxidation gas supply unit 152, and a circulation flow passage 161.

The intermediate plate 110 is a plate member made of a conductive material. As shown in FIG. 5, the intermediate plate 110 has through-holes 111, 112, 113, 114 that extend through the intermediate plate 110 in a thickness direction thereof. As will be described later, the through-holes 111, 112, 113, 114 constitute flow passages through which a fuel gas and an oxidation gas flow in the inspection device 100. These flow passages are configured to be connected to a plurality of connection ports of the single cells 8 mounted in the inspection device 100.

A water passage 115 is formed inside the intermediate plate 110. The water passage 115 is formed so as to allow cooling water to flow in through an inlet 115a and be discharged through an outlet 115b.

Cutouts 116 are formed at an upper end of the intermediate plate 110. As shown in FIG. 5 and FIG. 6, the single cell 8 mounted in the inspection device 100 is disposed so that the holes 81 are exposed through the cutouts 116 of the intermediate plate 110.

The plurality of intermediate plates 110 are arrayed in a straight line at predetermined intervals. The end plates 131, 132 are disposed on an outer side of the intermediate plates 110 that are located at both ends. The end plates 131, 132 are plate bodies made of a metal material. The insulators 121, 122 are disposed respectively between the intermediate plate 110 and the end plate 131 and between the intermediate plate 110 and the end plate 132. The insulators 121, 122 are insulating members that provide insulation between the intermediate plates 110 and the end plates 131, 132.

A through-hole (not shown) is formed in each single cell 8, each intermediate plate 110, the insulators 121, 122, and the end plates 131, 132. These through-holes are formed so that centers thereof coincide with one another when seen in an array direction of the intermediate plates 110. A shaft (not shown) is inserted through the through-holes, and both ends of this shaft are fastened with fasteners such as nuts. This fastening can compress the single cells 8 and the intermediate plates 110 so as to be brought into close contact with one another. With the single cells 8 thus compressed, protons move reliably between an anode and a cathode in an electrochemical reaction and the travel distance of these protons is reduced, so that the power generation efficiency can be increased.

The measurement unit 140 is a functional unit that measures properties of the single cells 8 (e.g., output voltage, output current, resistance, temperature, etc.). The measurement unit 140 is connected to each intermediate plate 110 through a cable 141.

The fuel gas supply unit 151 is a functional unit that supplies a fuel gas to the single cells 8. For example, the fuel gas supply unit 151 is a hydrogen tank that stores a hydrogen gas and a pump that pumps the hydrogen.

The oxidation gas supply unit 152 is a functional unit that supplies an oxidation gas to the single cells 8. For example, the oxidation gas supply unit 152 is a pump that pumps air. That is, the single cells 8 generate electricity using oxygen contained in air.

The circulation flow passage 161 is a flow passage through which cooling water is circulated to the water passages 115 of the intermediate plates 110. The circulation flow passage 161 is connected to the inlets 115a and the outlets 115b of the water passages 115. A pump 162 and a radiator 163 are disposed in the circulation flow passage 161.

During inspection by the inspection device 100, the fuel gas supplied from the fuel gas supply unit 151 flows into the single cells 8 through the through-holes 111 of the intermediate plates 110. Similarly, the oxidation gas supplied from the oxidation gas supply unit 152 flows into the single cells 8 through the through-holes 112 of the intermediate plates 110.

In each single cell 8 to which the fuel gas and the oxidation gas have been supplied, an oxidation reaction expressed by Formula (1) occurs at the anode. At the cathode of the single cell 8, a reduction reaction expressed by Formula (2) occurs. In the single cell 8 as a whole, an electrochemical reaction expressed by Formula (3) occurs.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

An excess fuel gas that has not been used in the electrochemical reaction in the single cells 8 is discharged from the single cells 8 through the through-holes 114 of the intermediate plates 110. Similarly, an excess oxidation gas that has not been used in the electrochemical reaction in the single cells 8 is discharged from the single cells 8 through the through-holes 113 of the intermediate plates 110.

The single cells 8 reach high temperature due to heat generated in the electrochemical reaction. As the pump 162 is activated, the cooling water flows through the circulation flow passage 161 and is supplied to the water passages 115 of the intermediate plates 110. Thus, the single cell 8 in contact with this intermediate plate 110 and the cooling water flowing through the water passage 115 can exchange heat. The heat that the cooling water has taken from the single cell 8 is released to the outside when the cooling water passes through the radiator 163. As a result, the single cell 8 can be cooled and maintained at an appropriate temperature.

The measurement unit 140 measures the properties of the single cells 8 that cause the electrochemical reaction, on the basis of information acquired from the intermediate plates 110 through the cables 141. The measurement unit 140 can collectively measure the properties of the plurality of single cells 8.

Next, the operation of loading or unloading the plurality of single cells 8 onto or from the inspection device 100 will be described with reference to FIG. 1 and FIG. 2 again.

To mount the plurality of single cells 8 onto the inspection device 100, first, an operator holds the plurality of single cells 8 by the holder 7, and moves the holder 7 as indicated by the arrow A1 so as to be supported on the lifting device 2. As described above, a constant force is applied to the protrusion 53 of the lifting plate 5 in the upward direction by the spring mechanism 6. As this force is applied, the lifting plate 5 can stand still with the arms 52 thereof supporting the holder 7.

The operator can move downward the plurality of single cells 8 along with the holder 7 as indicated by the arrow A2 in FIG. 2 by pushing downward the holder 7 supported by the arms 52. Here, the force with which the operator pushes the holder 7 is slight. The plurality of single cells 8 are moved downward while keeping the space left in between.

The single cells 8 having been moved downward along with the holder 7 simultaneously enter the spaces between the adjacent intermediate plates 110. After this entry, the projections provided on the holding sections 71 of the holder 7 are extracted from the holes 81 of the single cells 8 to release the single cells 8 held by the holder 7.

Next, the operator pushes the lower side of the holder 7 supported by the arms 52, and thus moves the holder 7 upward. This completes the operation of mounting the single cells 8 onto the inspection device 100.

To remove the plurality of single cells 8 from the inspection device 100 after the completion of inspection by the inspection device 100, first, the operator pushes downward the holder 7 supported by the arms 52, so as to dispose the holder 7 on the upper ends of the single cells 8.

Next, the operator inserts the projections provided on the holding sections 71 of the holder 7 into the holes 81 to hold the plurality of single cells 8 in the holder 7. Then, the operator pushes upward the holder 7 holding the plurality of single cells 8 to extract the single cells 8 from the spaces between the adjacent intermediate plates 110. Thus, the plurality of single cells 8 can be removed from the inspection device 100.

According to this configuration of the loading-unloading assist system 1, the operator can collectively load or unload the plurality of single cells 8 onto or from the inspection device 100 by holding the plurality of single cells 8 by the holder 7 and moving the holder 7 up and down by the lifting device 2. As a result, the burden of the operation of loading or unloading the plurality of single cells 8 onto or from the inspection device 100 can be relieved.

The holder 7 holds one end of each of the plurality of single cells 8. This makes it easy to release the single cells 8 from holding after being mounted onto the inspection device 100, as well as to hold the single cells 8 mounted on the inspection device 100.

To appropriately dispose the single cells 8 between the adjacent intermediate plates 110, or to remove the single cells 8 without excessively interfering with the intermediate plates 110, it is necessary that the holder 7 holding the single cells 8 is placed in an appropriate posture. For this purpose, the loading-unloading assist system 1 has angle adjustment mechanisms 9x, 9y, 9z that adjust an angle formed by the arms 52 relative to the base 3.

First, the angle adjustment mechanism 9x will be described with reference to FIG. 7. FIG. 7 is a side view of the arm 52 of FIG. 1. FIG. 7 shows only the configuration around the arm 52. The angle adjustment mechanism 9x is a mechanism that adjusts the angle by turning the arms 52 around an X-axis.

As shown in FIG. 7, a cutout 523 is formed at an end of the arm 52 in the Y-direction. The cutout 523 creates a space between the arm 52 and the front surface 51 of the lifting plate 5. The arm 52 is configured to be able to turn around a shaft 521 that is located above this space.

The angle adjustment mechanism 9x is composed of a protrusion 522 and a shim 91. The protrusion 522 is formed in the cutout 523 so as to protrude toward the front surface 51 of the lifting plate 5. The shim 91 is a plate member that is detachably disposed between the protrusion 522 and the front surface 51 of the lifting plate 5. As the front surface 51 supports the protrusion 522 through the shim 91, the arms 52 stand still at a predetermined angle relative to the base 3.

The angle adjustment mechanism 9x is configured to allow the angle of the arms 52 to be adjusted by changing the number of the shims 91 disposed between the protrusion 522 and the front surface 51. Specifically, compared with a state where two shims 91 are disposed between the protrusion 522 and the front surface 51 (see FIG. 7A), in a state where one shim 91 is disposed (see FIG. 7B), the arms 52 are disposed so as to shift downward as the distance from the base 3 increases.

Next, the angle adjustment mechanism 9y will be described with reference to FIG. 8. FIG. 8 is a front view of the lifting device 2 of FIG. 1. The angle adjustment mechanism 9y is a mechanism that adjusts the angle by turning the arms 52 around a Y-axis.

The angle adjustment mechanism 9y is composed of the screws 413*a* to 413*d*, screw holes 414*a* to 414*d*, the protruding plates 32, 415, and the adjustment bolt 33. The screw holes 414*a* to 414*d* are formed at the four corners of the first adjustment plate 41 and extend through the first adjustment plate 41 in the Y-direction. The screws 413*a* to 413*d* are inserted through the screw holes 414*a* to 414*d*. FIG. 8 shows only shaft parts of the screws 413*a* to 413*d*.

An inside diameter of the screw holes 414*b* to 414*d* is larger than an inside diameter of the screw hole 414*a*. Thus, a clearance between the shaft part of the screw 413*b* and the screw hole 414*b*, a clearance between the shaft part of the screw 413*c* and the screw hole 414*c*, and a clearance between the shaft part of the screw 413*d* and the screw hole 414*d* are larger than a clearance between the shaft part of the screw 413*a* and the screw hole 414*a*. This configuration allows the first adjustment plate 41 to turn within a predetermined range around the screw 413*a* and the screw hole 414*a* to thereby change the position thereof.

Figure 8A:
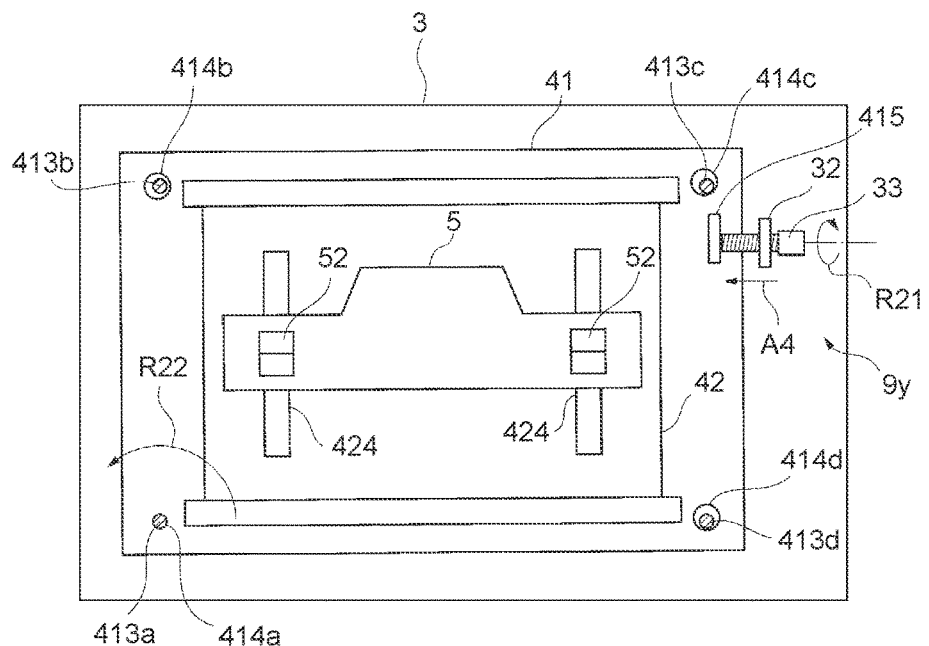
FIG. 8A is a front view of a lifting device of FIG. 1.

For example, if the operator turns the adjustment bolt 33 in the direction indicated by the arrow R21 in FIG. 8A, the adjustment bolt 33 moves in the direction indicated by the arrow A4. As a result, the protruding plate 415 in contact with the leading end of the adjustment bolt 33 is pushed and moves in the −X-direction (−X-direction is a direction opposite to a X-direction). Thus, the first adjustment plate 41 can turn in the direction indicated by the arrow R22 until at least one shaft portion of the screws 413*a* to 413*d* comes in contact with an inner surface of the screw holes 414*b* to 414*d*.

Figure 8B:
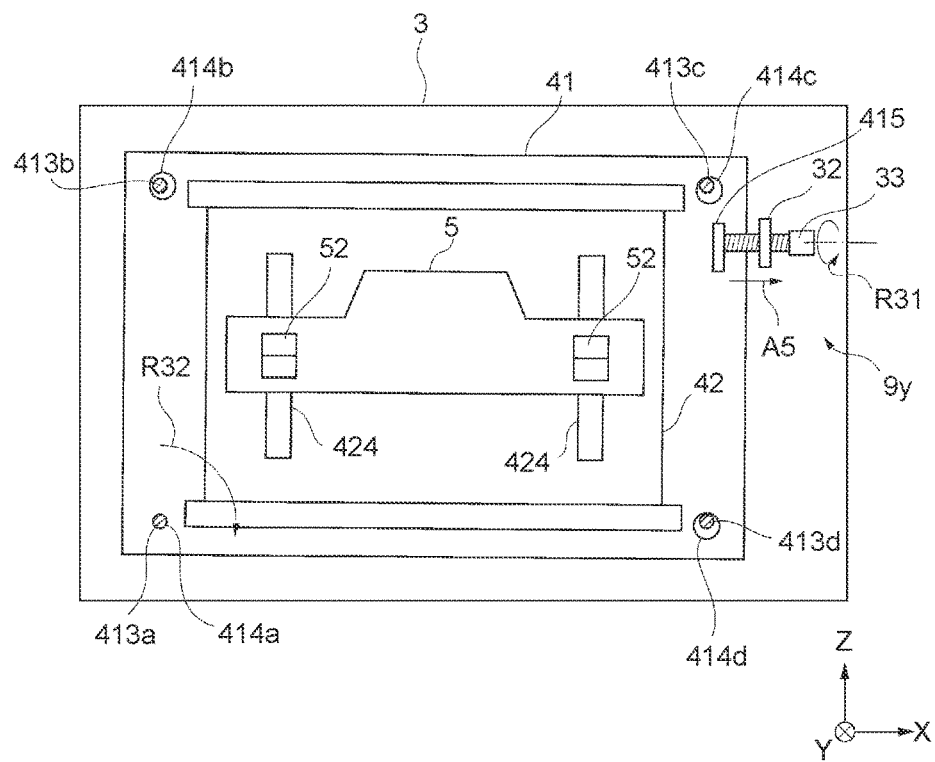
FIG. 8B is a front view of the lifting device of FIG. 1.

If the operator turns the adjustment bolt 33 in the direction indicated by the arrow R31 in FIG. 8B, the adjustment bolt 33 moves in the direction indicated by the arrow A5. As a result, the protruding plate 415 in contact with the leading end of the adjustment bolt 33 moves in the X-direction. Thus, the first adjustment plate 41 can turn in the direction indicated by the arrow R32 until at least one shaft part of the screws 413*a* to 413*d* comes in contact with the inner surface of the screw holes 414*b* to 414*d*.

After turning the first adjustment plate 41 in a predetermined amount, the operator increases a fastening force of the screws 413*a* to 413*d* to fix the first adjustment plate 41 to the base 3. Thus, according to the angle adjustment mechanism 9y, the angle of the arms 52 can be adjusted by adjusting the angle of the first adjustment plate 41.

Next, the angle adjustment mechanism 9z will be described with reference to FIG. 9 and FIG. 10. FIG. 9 is an enlarged view of the part IX of FIG. 1. FIG. 10 is a plan view of the lifting device 2. The angle adjustment mechanism 9z is a mechanism that adjusts the angle by turning the arms 52 around a Z-axis.

The angle adjustment mechanism 9z includes a shim 92. The shim 92 is a plate member made of a metal material. As shown in FIG. 9, the shim 92 has substantially a U-shape.

The corner of the first adjustment plate 41 is fastened with the screw 413*b* to the base 3, with a washer 416 interposed between the screw 413*b* and the first adjustment plate 41. The shim 92 is disposed so as to cover a periphery of a shaft part AX of the screw 413*b* between the base 3 and the first adjustment plate 41.

The angle adjustment mechanism 9z is configured to allow the angle of the arms 52 to be adjusted by changing the number of the shims 92 disposed between the base 3 and the first adjustment plate 41. As shown in FIG. 10A, in a state where no shim 92 is disposed between the base 3 and the first adjustment plate 41, the first adjustment plate 41 is disposed along the mounting surface 311 of the base 3. By contrast, as shown in FIG. 10B, in a state where one shim 92 is disposed between the base 3 and the first adjustment plate 41, the first adjustment plate 41 is disposed so as to be inclined relative to the mounting surface 311 of the base 3. As a result, the arms 52 are disposed so as to shift in the X-direction as the distance from the mounting surface 311 of the base 3 increases. The inclination angle of the arms 52 increases as the number of the shims 92 disposed between the base 3 and the first adjustment plate 41 increases.

As has been described above, the lifting device 2 includes the base 3, the arms 52 that support the holder 7 and move in the vertical direction relative to the base 3, and the angle adjustment mechanisms 9$x$, 9$y$, 9$z$ that adjust the angle formed by the arms 52 relative to the base 3. The posture of the holder 7 supported by the arms 52 can be adjusted by adjusting the angle formed by the arms 52 relative to the base 3. As a result, the single cells 8 can be disposed in an appropriate positional relation with the inspection device 100.

The lifting device 2 further includes the first adjustment plate 41 disposed between the arms 52 and the base 3. The angle adjustment mechanisms 9$y$, 9$z$ are configured to adjust the angle formed by the arms 52 relative to the base 3 by adjusting the angle of the first adjustment plate 41 relative to the base 3. According to this configuration, the angles of both the arms 52 can be adjusted at once by adjusting the angle of the first adjustment plate 41.

The embodiment of the present disclosure has been described above with reference to specific examples. However, the present disclosure is not limited to these specific examples. Thus, persons skilled in the art can appropriately make design changes to these specific examples, and any modified examples that have the features of the present disclosure are also included in the scope of the disclosure. The components in the above-described specific examples, and the arrangement, materials, conditions, shapes, sizes, etc. thereof are not limited to those illustrated but can be appropriately changed.

What is claimed is:

1. A loading-unloading assist system that assists in an operation of loading or unloading a plurality of single cells onto or from an inspection device, the loading-unloading assist system comprising:
    a holder configured to hold the plurality of single cells such that the single cells are detachable from the holder; and
    a lifting device configured to move the holder up and down, wherein
    the holder is configured to hold the plurality of single cells in a state where the single cells are arrayed in a straight line at predetermined intervals;
    wherein the holder holds one end of each of the plurality of single cells.

2. The loading-unloading assist system according to claim 1, wherein the lifting device includes:
    a base;
    arms configured to support the holder and move in a vertical direction relative to the base; and
    angle adjustment mechanisms configured to adjust an angle formed by the arms relative to the base.

3. The loading-unloading assist system according to claim 2, wherein
    the lifting device includes an adjustment plate that is disposed between the arms and the base, and
    the angle adjustment mechanisms are configured to adjust the angle formed by the arms relative to the base by adjusting an angle formed by the adjustment plate relative to the base.

\* \* \* \* \*